United States Patent [19]

Cronin et al.

[11] 4,176,392
[45] Nov. 27, 1979

[54] SERIES INDUCTION/PARALLEL INVERTER POWER STAGE AND POWER STAGING METHOD FOR DC-DC POWER CONVERTER

[75] Inventors: Donald L. Cronin, Anaheim, Calif.; John J. Biess, Canoga Park, Calif.

[73] Assignee: The United States of America as represented by the Secretary of the Army, Washington, D.C.

[21] Appl. No.: 860,366

[22] Filed: Dec. 14, 1977

[51] Int. Cl.² .............................................. H02M 7/00
[52] U.S. Cl. ......................................... 363/71; 363/26; 363/97
[58] Field of Search ........................ 363/25, 26, 65, 69, 363/71, 67, 74, 75, 134

[56] References Cited

U.S. PATENT DOCUMENTS

| | | | |
|---|---|---|---|
| 3,559,030 | 1/1971 | Bussard | 363/26 |
| 3,609,507 | 9/1971 | Beck | 363/71 X |
| 3,621,365 | 11/1971 | Beck | 363/71 |
| 3,675,037 | 7/1972 | Hamilton | 363/71 |
| 3,846,691 | 11/1974 | Higgins | 363/25 |
| 3,870,943 | 3/1975 | Weischedel et al. | 363/26 |
| 4,039,925 | 8/1977 | Fletcher et al. | 363/70 |

*Primary Examiner*—J. D. Miller
*Assistant Examiner*—Peter S. Wong
*Attorney, Agent, or Firm*—Nathan Edelberg; Jeremiah G. Murray; Michael C. Sachs

[57] ABSTRACT

An improved series inductor/parallel inverter power stage and power staging method for a transistor controlled DC-DC power converter in which the integrating capacitance is located in the output of the power stage transformer and the series inductor has a secondary winding connected across this capacitance for transferring stored energy from the inductor primary directly to the transformer output rather than through the transformer, and current flow through the transformer primary is controlled by two parallel, alternately conducting pulse-width-modulated transistors in a manner such that only a single transistor is located in the main current flow path at any given time. The improved power stage is characterized by reduced power dissipation and peak voltage stresses on the transistors, increased simplicity, and improved reliability.

A DC-DC power converter having at least two improved power stages of the invention arranged in parallel and adjusted for conduction of preset fractions of the total power in phased relation.

5 Claims, 4 Drawing Figures

SERIES INDUCTION/PARALLEL INVERTER POWER STAGE AND POWER STAGING METHOD FOR DC-DC POWER CONVERTER

The invention herein described was made in the course of or under a contract or subcontract thereunder, with the Department of the Air Force.

BACKGROUND OF THE INVENTION

1. Field

This invention relates generally to DC-DC power converters and more particularly to an improved series inductor/parallel inverter power stage and power staging method for a transistor controlled DC-DC power converter.

2. Prior Art

One common prior art DC-DC power converter receives current from a DC source, which may be an unregulated source, chops it with a switching device or chopper such as a transistor, integrates the chopped signal with an inductive/capacitive network, converts the integrated DC signal to AC with a transistor inverter, transforms the AC to another voltage in a transformer, and rectifies the transformer output to provide the desired converter DC output voltage.

In this existing converter power stage, the integrating capacitance is located in the input to the transformer, between the chopper and the inverter. The chopper transistor is turned on and off with a duty cycle proportional to the deviation of the converter output voltage from a preset voltage level to be maintained. The inverter power transistors are turned on and off alternately with equal on and off times such that one or the other of these transistors is always conducting.

This type of converter power stage is subject to large current and voltage transients which can easily damage the converter transistors or cause them to fail, unless they are highly over-rated. These transients may be due to overlapping of the inverter transistor on times, transformer core saturation resulting from unequal on times of the inverter transistors, and output shorts.

Another disadvantage of this converter power stage resides in the fact that two transistors, namely the chopper transistor and one or the other of the inverter transistors, are always situated in series in the main power flow path. This results in excessive power dissipation.

It has been proposed in the past to avoid excessive transients in such converter power stages by placing the input integrating capacitance in the transformer output and connecting as inductor choke in series with the power transformer primary winding. An example of this form of converter power stage, which is commonly referred to as a series inductor power stage, is described in my prior U.S. Pat. No. 4,034,280. The series inductor provides an impedance in series with the power transistors for limiting peak current flow during output shorts, power transformer saturation, and power transistor overlap. The power stage of the latter patent, however, like that described first, is subject to excessive power dissipation due to the presence of two transistors in series in the main power flow path at all times.

Utilization of such a converter power stage for high power applications also presents a problem. Thus, the maximum power rating of existing transistors places a severe constraint on the maximum power levels which may be handled.

SUMMARY OF THE INVENTION

One aspect of the invention is concerned with an improved series inductor, parallel inverter power stage and power staging method for DC-DC power converters, which avoid the above noted and other disadvantages of the existing converter power stages discussed above.

According to this aspect of the invention, the three transistors of the existing power stages, i.e., the chopper transistor and two inverter transistors, for converting the DC input to a fluctuating or AC current flow in the primary of the power stage transformer and regulating this current to maintain a constant DC output, are replaced by two pulse-width-modulated transistors. The integrating capacitance of the power stage is located in the output of the transformer, and the series inductor has a secondary winding coupled through a rectifier to this capacitance.

In operation, the two inverter transformers are driven on and off alternately with drive signals which are pulse-width-modulated in response to the converter output voltage to maintain this voltage constant. The energy stored periodically in the series inductor primary is transferred through its secondary directly to the power stage output.

This improved power stage is characterized by having only a single transistor in the main power flow path at any given time and by reduced peak voltage stresses on the transistors and reduces power dissipation.

According to another aspect, the invention provides a DC-DC power converter having a number of the present improved power stages coupled in parallel and operable in phased relation for sharing the power converter load and thereby permitting increased power transfer.

DESCRIPTION OF THE PREFERRED EMBODIMENTS

Figure 1:
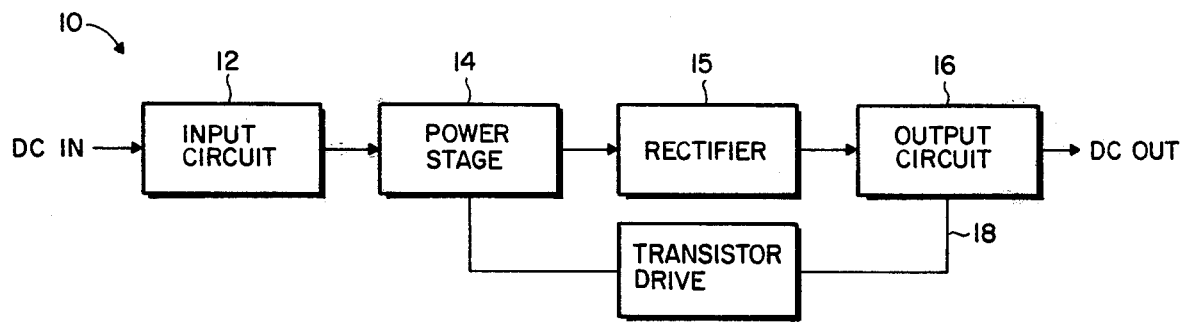
FIG. 1 is a box diagram of the present DC-DC converter power stage.

Reference is made first to FIG. 1 illustrating, in block diagram fashion, a DC-DC power converter 10 embodying the invention. This power converter includes an input circuit 12, a power stage 14, a rectifier 15, an output circuit 16, and a feedback circuit 18. Input circuit 12 receives and conditions a DC input from a DC source, such as a battery. The power stage 14 embodies a parallel inverter including two pulse-width-modulated transistors which converts the DC input to an AC signal and transfers the latter through a transformer to the output circuit 16. This power stage output is rectified at 15 and filtered in the output circuit 16 to provide a DC output of the desired voltage level. Feedback circuit 18 comprises a pulse-width-modulated drive control which senses the converter output voltage and applies to the bases of the power stage transistors pulse-width-modulated (PWM) signals. These PWM signals turn the transistors on and off alternately with on and off times which are regulated in response to the converter output voltage in such a manner as to maintain the output voltage substantially constant at the desired voltage level.

Figure 2:
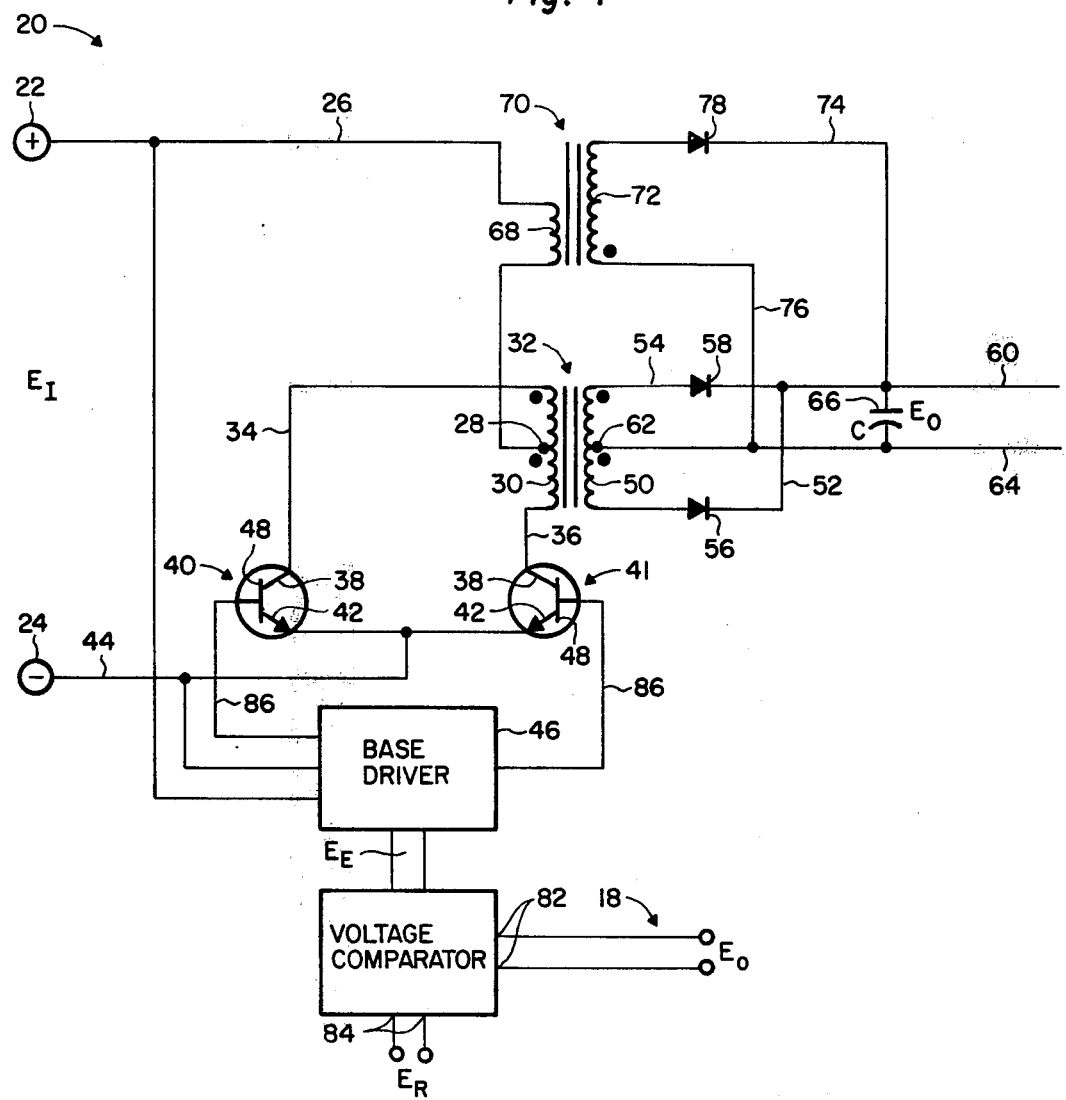
FIG. 2 is a schematic diagram of the converter power stage.

According to one of its aspects, this invention provides a novel series inductor/parallel inverter circuit for the converter power stage 14. The improved power stage circuit is illustrated at 20 in FIG. 2.

Power stage circuit 20 has positive and negative input terminals 22, 24 for connection to the input conditioning circuit 12. Positive input terminal 22 connects through a lead 26 to a center tap 28 on the primary winding 30 of a transformer 32.

Connected through leads 34, 36 to the ends of the transformer primary winding 30 are the collectors 38 of parallel inverter transistors 40, 41. The transistor emitters 42 are connected through a common lead 44 to the negative input terminal 24. A transistor driver 46 is connected to the transistor bases 48.

The ends of the secondary winding 50 of the transformer 32 are connected through leads 52, 54 containing diodes 56, 58 to a common output lead 60. The secondary winding 50 has a center tap 62 connected to an output lead 64. A filter capacitor 66 is connected across the output leads 60, 64. Diodes 56, 58 and filter capacitor 66 constitute the rectifier 15. Rectifier output leads 60, 64 connect to the converter output circuit 16.

Connected in series in the positive input lead 26 is the primary winding 68 of a series inductor 70. This inductor is an iron core inductor having a secondary winding 72 connected through leads 74, 76 across the output filter capacitor 66. A diode 78 is connected in series in lead 76 to form a rectifier with the filter capacitor 66.

As will be explained in more detail presently, the transistor driver 46 is part of the feedback circuit 18 which applies pulse-width-modulated signals to the transistor bases 48 for turning the transistors 40, 41 off and on alternately in such a way as to maintain a relatively constant output voltage at the output of the power converter. Suffice it to say at this point that each time the transistor 40 turns on, the input voltage $E_I$ is impressed across the primary windings 30, 68 of the transformer 32 and series inductor 70. Current flow occurs through the upper half of the transformer secondary 50 and corresponding diode 58 but not through the secondary 72 of the series inductor 70. Current flow through the currently conducting transistor 40 and the transformer primary 30 changes in accordance with the flux swing $E = -L(di/dt)$ of the series inductor 70 where L is the inductor inductance. Under these conditions, the impressed voltage across the non-conducting transistor 41 is twice the converter output voltage $E_O$, i.e., $2(E_O)$.

When the transistor 40 turns off, the energy stored in the series inductor 70 is transferred directly to the output filter capacitor 66 through the inductor output diode 78. The voltage now impressed across the transistor 41 is the input voltage $E_I$ plus the counter EMF $E_L$ of the series inductor.

Figure 3:
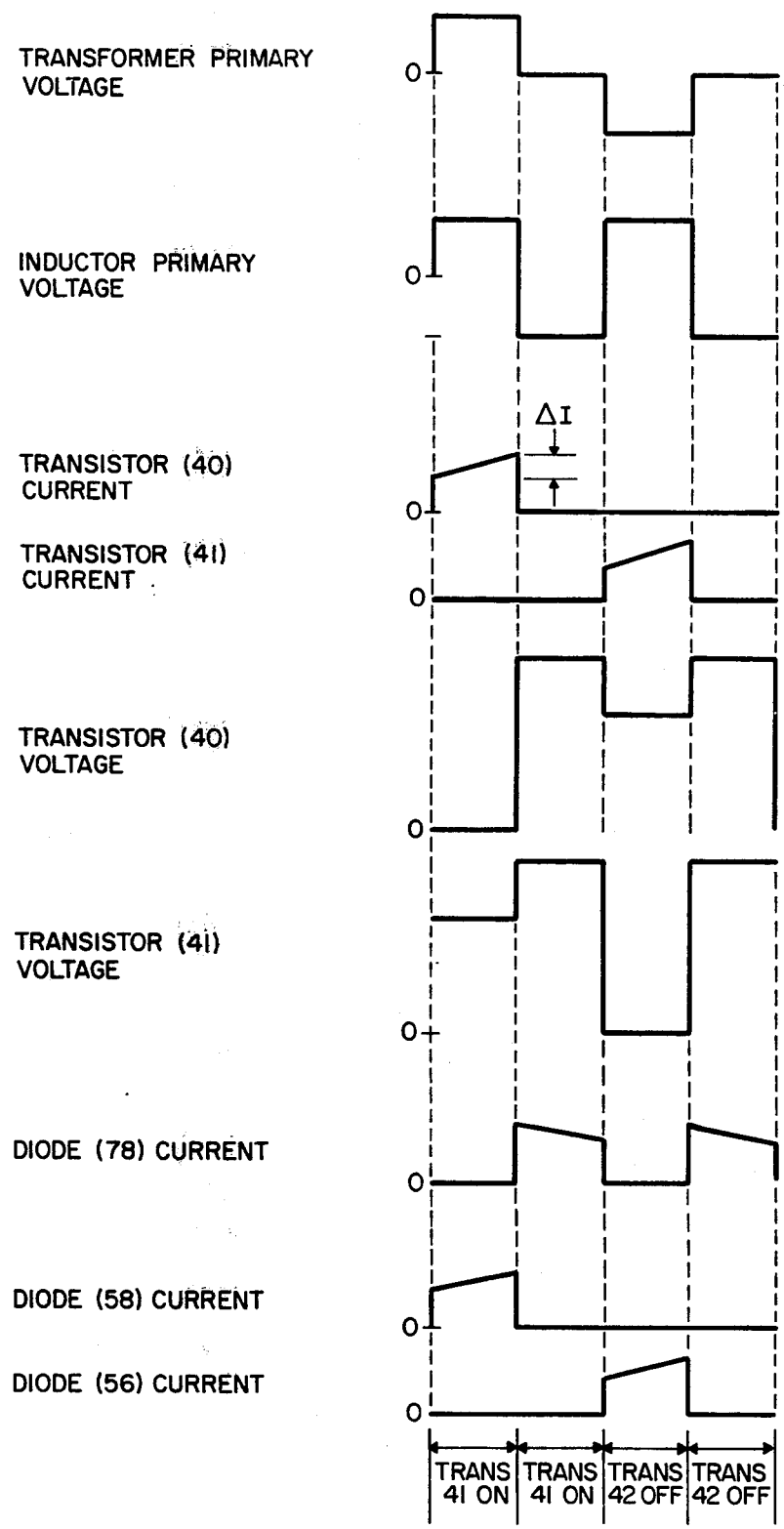
FIG. 3 illustrates certain current and voltage waveforms in the circuit.

Essentially the same conditions occur when the second transistor 41 turns on and then off. The various current and voltage waveforms during this power stage operation are illustrated in FIG. 3.

As noted earlier, transistors 40, 41 are controlled by the feedback circuit 18 which is a pulse-width-modulated transistor driven control circuit. This drive circuit turns the transistors on and off with switching signals which are pulse-width-modulated in response to the power converter output voltage $E_O$ in such a way as to maintain this voltage essentially constant at a preset DC voltage level.

Any suitable conventional pulse-width-modulated transistor drive circuit can be used as the feedback circuit 18. Accordingly, it is unnecessary to describe or illustrate the circuit in elaborate detail. Suffice it to say that the transistor drive control circuit includes a voltage comparator 80 having a first input 82 connected to the converter output for receiving the converter output voltage $E_O$ and a second input 84 which receives a preset reference voltage $E_R$. The comparator generates an output error signal $E_E$ proportional to the deviation of the output voltage from the reference voltage.

Error signal $E_E$ is applied to the transistor base driver 46. This transistor driver comprises any suitable control logic for generating pulse-width-modulated transistor driving signals related to the error signal and conditioned to turn the transistors 40, 41 on and off alternately in a manner which maintains the desired converter output voltage $E_O$. The pulse-width-modulated signals from the driver are applied to the transistor bases 48 through leads 86.

If desired, a peak current sensor may be connected in series between the transformer and inductor primary windings 30, 68 to the transistor base driver 46 for causing the latter to turn off both inverter transistors 40, 41 in response to a preset peak current flow in the transformer input.

Operation of the DC-DC converter power stage 20 is now apparent. Thus, the inverter transistors 40, 41 turn on and off alternately to cause AC current flow through the transformer primary winding 30 and series inductor primary winding 68. This primary AC current flow is transformed to a DC voltage across the output capacitor 66.

The energy stored in the series inductor 70 during conduction of the transistors 40, 41 is transferred through the inductor secondary 72 to the output capacitor 66 during the non-conducting periods of the transistors.

The present power stage circuit has a number of advantages. The circuit eliminates the integrating capacitance in the power stage input and, thereby, the earlier discussed high peak voltage transients which result from this input capacitance. Any transients which do occur are limited by the impedance of the series inductor 70 which is in series with the transistors 40, 41. The circuit eliminates the separate chopper transistor and inverter transistors of the existing power stages. As a consequence, at any given instant in the power stage operation only one transistor, i.e., either inverter transistor 40 or 41, is in the main current flow path. Power dissipation is thereby reduced.

Another feature of the invention resides in a DC-DC power converter embodying a number of the present improved series inductor/parallel inverter power stages arranged in parallel and controlled in a unique way to share preset portions of the total load. This power converter is shown in box diagram fashion in FIG. 4.

Figure 4:
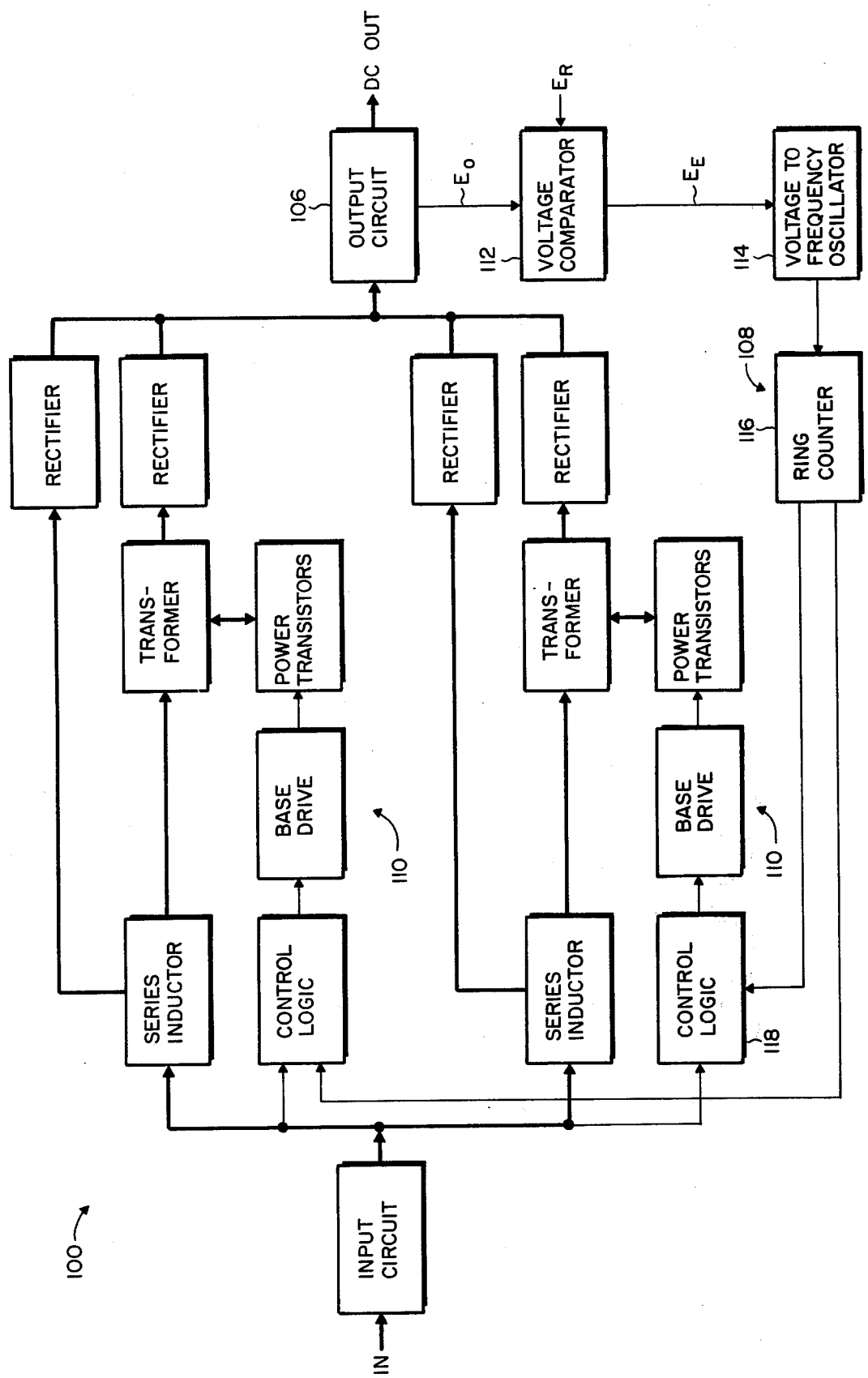
FIG. 4 is a box diagram of a multi-power stage, high power DC-DC power converter according to the invention.

The DC-DC power converter 100 of FIG. 4 comprises an input circuit 102 for conditioning the DC input to the power stage 104 of the converter, an output circuit 106 which receives, filters, and otherwise processes the DC output from the power stage, as necessary for utilization of the output, and a feedback circuit 108 for controlling the power stage 104 to maintain a constant DC output voltage. The converter power stage 104 comprises a number of individual series inductor/parallel inverter power stages 110 arranged in parallel. The individual power stages 110 are essentially identical to the power stage 20 described earlier except for certain differences which are hereafter noted.

Accordingly, it is unnecessary to describe and illustrate the parallel power stages 110 in elaborate detail. In this regard, the similarity of the power stages 20, 110 is readily apparent from the box diagram of FIG. 4.

Feedback circuit 108 comprises a voltage comparator 112 which receives the converter output voltage $E_O$ and a reference voltage $E_R$ and generates on output error voltage $E_E$ related to the deviation of the output voltage $E_O$ from the DC voltage level ($E_R$) to be maintained. This error signal is fed to an oscillator 114 whose output is an AC signal with a frequency proportional to the output error voltage $E_E$ from the comparator 112.

The AC signal from the oscillator 114 drives a ring counter 116 which delivers trigger pulses to control logic circuits 118 for the individual power stages 110, in succession. These trigger pulses occur at uniform intervals and at a frequency proportional to the AC input signal frequency to the ring counter.

The control logic 118 for each parallel power stage 110 contains conventional flip-flop circuitry for turning the corresponding power transistors on and off alternately. This circuitry is triggered to turn on the transistors alternately by the corresponding trigger pulses from the ring counter 116. The control logic 118 also contains adjustable volt/second timing circuitry which senses the input line voltages and turns off each transistor in response to passage of a preset quantum of energy to the transformer and series inductor of the respective power stage.

The volt/second timing circuitry of the parallel power stages 110 are adjusted so that the stages share the total power load in some preselected proportion, typically equally. In the particular converter illustrated, for example, the power stages 110 may be adjusted so that each handles one half the total load.

It will be understood, of course, that the number of parallel power stages may be increased to reduce the fraction of the load carried by each stage. Proper phase displacement of the several parallel power stages is effected by the ring counter whose output circuits will equal in number the parallel power stages to be controlled.

What is claimed is:

1. A DC-DC power converter circuit comprising: input means for receiving DC power from a DC source, output means, a plurality of parallel inverter power stages connected in parallel between said input and output means, each said parallel power stage comprising a transformer having a primary winding connected to said input means and a secondary winding, transistors forming a parallel inverter connected to said primary winding and adapted to be turned on and off alternately for converting DC power from said DC source to a fluctuating current flow in said primary winding to induce a fluctuating current in said transformer secondary winding, and pulsewidth-modulated transistor drive means for applying pulse-width-modulated driving signals to said transistors for turning said transistors on and off alternately, and rectifying means connecting said transformer secondary winding to said output means for rectifying said fluctuating volttage to a DC voltage and delivering said DC voltage to said output means to provide a DC output voltage from said converter, and feedback means for sensing the converter circuit's output voltage and activating said pulse-width-modulated transistor drive means of said parallel power stages in a variable sequential rate generated in response to said output voltage error to effect power conduction through said parallel stages in phased relation and maintain said output voltage constant.

2. The power converter of claim 1 wherein said feedback circuit comprises a voltage comparator for producing an error signal proportional to the deviation of said output voltage from a preset DC voltage level, oscillator means for producing an AC signal having a frequency proportional to said error signal, a ring counter for receiving said AC signal and delivering trigger pulses to said parallel power stages in sequence at a frequency proportional to said AC signal frequency, and control logic for each parallel power stage which turns the corresponding transistors on alternately and turns each corresponding transistor off in response to passage of a preset quantum of energy to the respective power stage transformer.

3. The power converter of claim 2 wherein said control logic for each power stage is adjustable to regulate said preset energy quantum of each parallel power stage.

4. The power converter of claim 1 wherein:
each power stage includes an inductor having a primary winding in series with the respective transformer primary winding and a secondary winding, whereby fluctuating current flow occurs through said inductor primary winding to induce a fluctuating voltage in said inductor secondary winding, and
said rectifying means is connected to said inductor secondary winding to rectify and combine said fluctuating voltages.

5. The method of DC-DC power conversion comprising the steps of
converting DC power from a DC source to AC power within the primary windings of at least two transformers connected in parallel to said DC source to form parallel power stages by conducting DC current from said source alternately through first and second pulse-width-modulated transistors forming a parallel inverter connected to the primary winding of each transformer and through the respective primary winding in a manner such that current flows in one direction through each primary winding when its first transistor is conducting and in the opposite direction through the respective primary winding when its second transistor is conducting, thereby to induce a fluctuating voltage in said secondary winding of each transformer,
rectifying the fluctuating output voltage from each transformer secondary winding to produce a DC output voltage,
combining the DC output voltages from said transformers to provide a combined DC output,
controlling said transistors with pulse-width-modulating driving signals which turn said transistors on and off in such a way as to effect power transfer through said power stages in parallel and in preset phased relation,
sensing the combined DC output voltage,
generating trigger pulses which occur at uniform intervals and at a frequency proportional to the deviation of said DC output voltage from a fixed DC voltage level, transmitting said trigger pulses to said power stages in sequence,
turning the transistors in each power stage on alternately in response to each corresponding trigger pulse and turning off each transistor in response to passage of a preset measured quantum of energy to the respective transformer primary winding.

* * * * *

UNITED STATES PATENT AND TRADEMARK OFFICE
CERTIFICATE OF CORRECTION

PATENT NO. : 4,176,392
DATED : November 27, 1979
INVENTOR(S) : Donald L. Cronin, et al.

It is certified that error appears in the above-identified patent and that said Letters Patent are hereby corrected as shown below:

In column 1, line 8, --Air Force-- has been corrected to read--Army---.

Signed and Sealed this

First Day of April 1980

[SEAL]

Attest:

SIDNEY A. DIAMOND

Attesting Officer          Commissioner of Patents and Trademarks